United States Patent Office 3,528,854
Patented Sept. 15, 1970

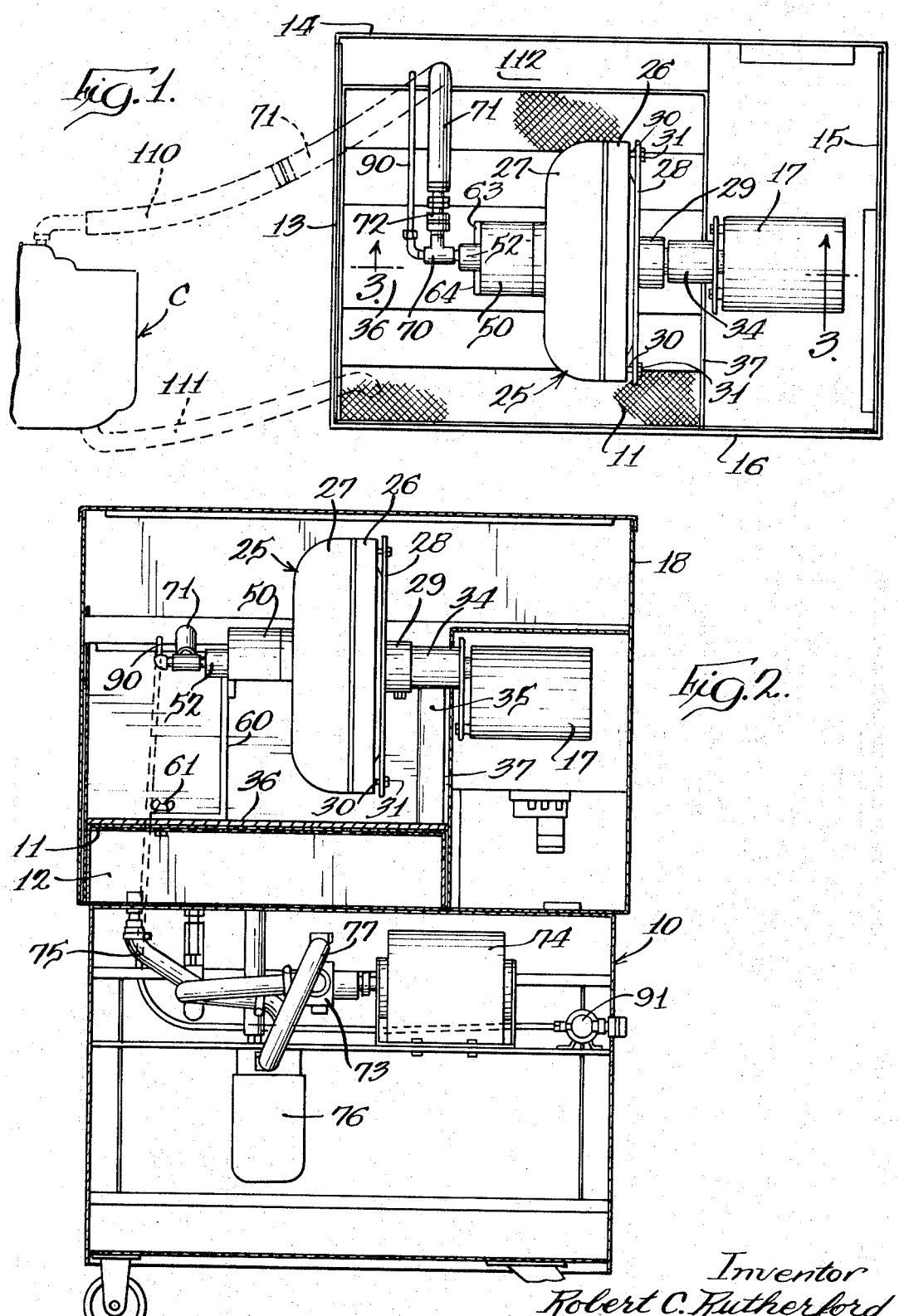

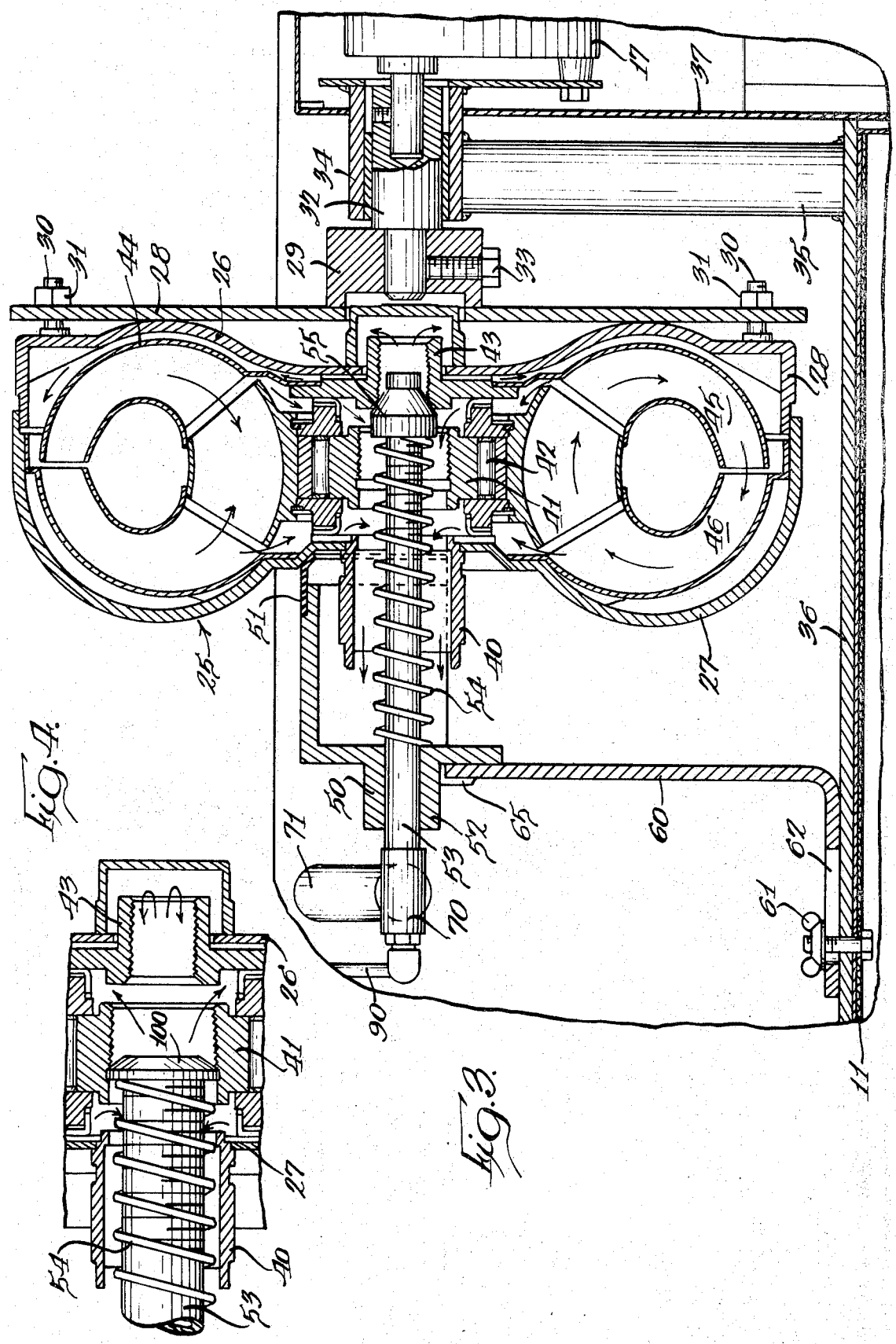

3,528,854
TORQUE CONVERTER CLEANING PROCESS AND APPARATUS
Robert C. Rutherford, Owatonna, Minn., assignor to Owatonna Tool Company, a corporation of Minnesota
Filed Sept. 15, 1967, Ser. No. 668,023
Int. Cl. B08b 9/08, 9/18
U.S. Cl. 134—23                                                 11 Claims

ABSTRACT OF THE DISCLOSURE

A torque converter cleaning apparatus and method having structure for continuously rotating a torque converter while simultaneously flowing cleaning fluid through the torque converter to have the cleaning fluid lifted and passed through the torque converter due to the rotation thereof, with the introduction of intermittent air pulses into the system to provide high fluid turbulence and effective scrubbing action resulting from limiting the head of the cleaning fluid in the torque converter and the apparatus also being capable of cleaning the oil cooler.

BACKGROUND OF THE INVENTION

This invention relates to cleaning of torque converters and, more particularly, to a process and apparatus for cleaning torque converters using continuous rotation of the torque converter about a central axis thereof with simultaneous and continuous flow of cleaning fluid through the torque converter.

Torque converters, as used in automatic transmissions for vehicles, frequently must be cleaned and, with present constructions thereof, it is not possible to disassemble the converter body to permit simple cleaning of the interior parts. The cleaning is important because contaminants suspended in automatic transmission fluid and inside the torque converter may be circulated to the valving of the transmission system, resulting in serious malfunctioning of the transmission. It is recommended procedure to thoroughly clean torque converters prior to reassembly of transmission which have been disassembled. It has been known to attempt cleaning of the torque converter by filling thereof with cleaning fluid, such as kerosene, and shaking the converter and then draining the fluid from the converter body. Because of the shape of the interior parts of the torque converter, this process is a haphazard way of attempting cleaning of the torque converter. It is also known to place the torque converter on a vibratory frame to facilitate the passage of cleaning fluid through the torque converter; however, this still does not obtain maximum cleaning action by flow through the entire torque converter.

SUMMARY

An object of this invention is to provide a new and improved process and apparatus for cleaning of torque converters utilizing continuous flow of cleaning fluid through the torque converter while simultaneously rotating the converter to thoroughly distribute the cleaning fluid in the converter and pick up contaminants therewithin.

Another object of the invention is to provide a new and improved apparatus for cleaning of torque converters wherein the torque converter is mounted for rotation about a central axis at one face thereof and, at the opposite face, a standpipe is yieldably extendible to pass into the interior of the torque converter for directing cleaning fluid into the torque converter while the torque converter is being rotated, so as to have the cleaning fluid carried throughout the torque converter by the rotation thereof, the cleaning fluid flowing from the torque converter through a space between the outer perimeter of the standpipe and the interior of the pump drive coupling to fall to a collector, and means are provided for intermittently directing air pulses into the cleaning fluid to obtain fluid turbulence for better cleaning action.

Still another object of the invention is to provide an adapter for use in an apparatus for cleaning torque converters and oil coolers as defined in the preceding paragraph wherein different standpipe caps may be used depending on the fluid flow clearances of a particular torque converter and auxiliary hoses are provided to enable the unit to clean the oil cooler for a complete cleaning of parts in a transmission overhaul.

Further objects and advantages will become apparent from the following detailed description taken in connection with the accompanying drawings in which:

BRIEF DESCRIPTION OF THE DRAWING

FIG. 1 is a plan view of the torque converter cleaning apparatus showing an alternate oil cooler connection in broken line and with a cover removed;

FIG. 2 is a front elevation with the front panel removed and some wall members in section;

FIG. 3 is a fragmentary vertical section, on an enlarged scale, taken generally along the line 3—3 in FIG. 1; and FIG. 4 is a vertical section, similar to FIG. 3, showing a modified form of standpipe cap in association with a torque converter.

While the apparatus of this invention is susceptible of embodiment in many different forms, there is shown in the drawings and will herein be described in detail an apparatus embodiment of the invention along with a modification thereof with the understanding that the present disclosure is to be considered as an exemplification of the mechanical and process principles of the invention and is not intended to limit the invention to the embodiment illustrated. The scope of the invention will be pointed out in the appended process and apparatus claims.

DESCRIPTION OF THE PREFERRED EMBODIMENT

The apparatus as shown generally in FIGS. 1 and 2 embodies a stand, indicated generally at 10, having a fluid collecting station defined by a filter screen 11 overlying a reservoir 12 and with side walls extending upwardly from the level of the filter and identified at 13, 14, 15, and 16 which extend upwardly to the level of a drive motor 17 disposed at the top of the stand. An openable cover 18 overlies the top of the stand.

A torque converter to be cleaned, indicated generally at 25, is positioned over the filter 11 and has a welded casing consisting of parts 26 and 27, with the front face of the part 26 being releasably connected to a mounting member in the form of a plate member 28 which extends radially from a hub 29, as shown particularly in FIG. 3. The plate member 28 has pairs of openings, a pair at each end thereof, with each receiving a mounting bolt 30 extending from the face of the torque converter body part 26 and which are held in assembled relation by the nuts 31. With the assembly of the torque converter to the mounting plate 28, the assembly is supported on a disconnectable drive shaft 32 extending from the drive motor 17. The hub 29 is fastened to drive shaft 32 by a lock bolt 33. This drive shaft is supported by a bearing 34 (FIG. 3) mounted at the upper end of a support post 35 fastened to a horizontal panel 36 extending across the stand 10 above the filter screen 11. A dividing wall 37 extends upwardly to separate the space in which the torque converter is mounted from the area containing the drive motor 17.

With the foregoing structure, it will be seen that the torque converter can be rotated by the drive motor 17 through the drive shaft 32 with the preferred speed of rotation being in the range of approximately 20 r.p.m.

The internal construction of the torque converter is well-known and only general reference need be made thereto. A front pump drive coupling 40 extends from the body part 27 of the torque converter and disposed centrally within the converter is a stator hub 41 and a stator clutch 42. A runner hub 43 is located at the side of the converter opposite the drive coupling 40 and a runner 44 extends radially outwardly from the runner hub 43. Disposed within the torque converter are relatively movable concave elements 45 and 46 which form pockets which tend to hold fluid and are difficult to clean except that the rotation imparted to the torque converter in the process and by the apparatus disclosed herein facilitates the cleaning of these surfaces and spaces.

The means for continuously supplying cleaning fluid to the interior of the torque converter comprises the standpipe and associated structure as shown in detail in FIG. 3 and the remainder of the apparatus in FIGS. 1 and 2.

A splash guard in the form of a downwardly-open partial cup section 50 has a plastic member 51 at one end which engages the outer surface of the torque converter to prevent upward spray of the cleaning fluid while permitting relative rotation. The bearing member is formed of a suitable bearing material, such as nylon or Teflon. The splash guard 50 has a cylindrical end 52 which movably receives a part of an externally threaded hollow standpipe 53 which extends outwardly beyond the splash guard to be positioned within the interior of the torque converter. The standpipe 53 is urged outwardly of the splash guard by a compression spring 54 extending between the splash guard end 52 and a hollow standpipe cap 55 mounted at the outward end of the standpipe. The spring functions to urge the standpipe outwardly and the standpipe cap into engagement with the runner hub 43. The partial cup 50 is supported by a bracket 60 adjustably and releasably connected to the horizontal panel 36 by a fastener 61 engaging in a slot 62 in the bracket. The bracket is formed at its upper end with a pair of upwardly-extending spaced legs 63 and 64 which receive a lug 65 therebetween which extends from the collar 52 to locate the cup 50 in a front-to-rear direction relative to the stand and to hold the splash guard against rotation. Cleaning fluid is supplied to the standpipe 53 through a fitting 70 extending therefrom which is connected to a fluid supply line 71 through a quick-disconnect coupling 72.

The fluid supply line 71 is connected to a pump 73 driven by motor 74. The pump inlet receives cleaning fluid from reservoir 12 through a fluid connection including a line 75, a filter 76 for removing contaminants and a line 77 connected to the pump inlet. The filter 76 is important for final removal of contaminants because the cleaning fluid is recirculated.

In utilization of the cleaning apparatus, the torque converter is mounted on the mounting plate 28 and attached to the motor drive shaft, the splash guard and standpipe are assembled and positioned as shown in FIG. 3 with the support bracket 60 being appropriately adjusted and fixed in position, and the fluid line 71 is connected to the fitting 70. The drive motors 17 and 74 are started and the pump 73 supplies fluid to the standpipe 53, with the fluid then flowing in the direction of the arrows through the standpipe 53 and standpipe cap 55 abutting against runner 43 and through the interior passage in the runner hub 43. The cleaning fluid then flows outwardly to the outer circumferential areas of the torque converter and then passes through the various spaces and along the surfaces of the torque converter apparatus until it moves radially inward to either side of the stator bushings with the flow as indicated by the arrows then flowing outwardly of the torque converter in the space provided between the outer perimeter of the standpipe and the inner perimeter of the opening in the drive coupling 40. The fluid then falls to and through the filter 11 into the reservoir 12 where it is then available for pick up by the pump 73 for recirculation. During this continuous flow operation, the rotation of the torque converter causes the curved elements within the torque converter to pick up and carry cleaning fluid about a portion of the arc of revolution so as to thoroughly flow over and cleanse the interior areas of the torque converter.

The cleaning action is further facilitated by introducing air pulses into the cleaning fluid to assist in blowing entrained particles through small openings within the torque converter and obtaining a more effective scrubbing action. The air functions to limit the head of the cleaning fluid in the torque converter which allows more turbulence and thus improves the scrubbing action. This air is supplied through a line 90 having a solenoid-controlled valve 91 operated from a timer to provide intermittent flow of air to the fitting 70 and have the air move along the standpipe 53.

Although not to be considered as limiting, it has been found in actual operation that extreme high efficiency in cleaning of the torque converter is obtained when the torque converter is rotated approximately 20 r.p.m. and with the cleaning fluid being supplied at a relatively low pressure of 8 to 10 p.s.i. and with the air being delivered in the range of 40 to 60 p.s.i. for a cycle of approximately 30 minutes.

Because of the difficulty in draining all of the cleaning fluid from some torque converters, a hole can be drilled in one of the body parts of the torque converter as a preliminary step for obtaining final drainage and this hole can then be closed with an expandable rivet after cleaning.

An alternate form of standpipe cap is shown in FIG. 4 for use when there is not adequate clearance for fluid flow past the runner hub 43. In FIG. 4, a hollow standpipe cap 100 of a larger diameter than cap 55 is threaded onto the standpipe and because of its larger diameter the cap seats against the stator 41 of the torque converter to result in fluid flow radially outwardly therefrom as shown by the arrows in FIG. 4. The resulting lesser insertion of a standpipe 53 is accommodated by spring 54.

As part of a transmission overhaul, the oil cooler of the vehicle should also be cleaned. The apparatus disclosed herein is usable for such purpose by moving the stand 10 on its supporting wheels to a position adjacent the vehicle. A pair of auxiliary hoses 110 and 111 that can be stored in a storage compartment 112 of the stand 10 are then put in use with one of the hoses connecting to the oil cooler C and to the fluid line 71 that has been disconnected from fitting 70. The other hose connects to the oil cooler and has an outlet end overlying the filter 11 as shown in FIG. 1. After cleaning of the oil cooler, the auxiliary hoses can again be stored in compartment 112.

I claim:

1. The method of cleaning a torque converter having an opening along the central axis thereof comprising, continuously supply cleaning fluid under pressure through said opening along a controlled path to a specific location inside said torque converter, limiting the head of cleaning fluid in the torque converter, rotating said torque converter in a substantially vertical position about said central axis with the central axis disposed generally horizontally and at a speed to have the curved elements therein lift the cleaning fluid and entrained particles to a level above said central axis while not throwing the particles outwardly by centrifugal force, and discharging said cleaning fluid from the torque converter through said opening and independently of said controlled path.

2. The method of claim 1 wherein the step of limiting the head of cleaning fluid is accomplished by intermittently supplying air pulses to the controlled path of cleaning fluid.

3. The method of claim 1 wherein the speed of rotation of the torque converter is approximately 20 r.p.m.

4. The method of cleaning a torque converter having an opening defined by the front pump drive coupling thereof which is coaxial with the central axis of the torque converter comprising the following steps: rotating said converter in a generally upright position, said central axis disposed generally horizontally, and at a slow enough speed to prevent radial outward movement of fluid entrained particles while sufficiently fast to cause the curved elements in the torque converter to lift fluid and particles as the torque converter is rotated, continuously supplying cleaning fluid under pressure along a confined path extending through the drive coupling opening, adding air under pressure to said supply of cleaning fluid to limit the amount of fluid in the torque converter, and continuously discharging cleaning fluid from the torque converter through said coupling opening along a path independent of said controlled path whereby cleaning fluid and particles lifted by said curved elements can flow toward said central axis and out of the torque converter along said independent path.

5. An apparatus for cleaning torque converters comprising, a stand, means on the stand for collecting cleaning fluid discharged from the converter, means on the stand for releasably holding the converter in a generally upright position over said collecting means with the central axis of the converter disposed generally horizontally, a fluid conducting fitting extending through the drive coupling opening to engage a portion of the torque converter interior, a fluid supply line connected to said fitting for supplying cleaning fluid under pressure thereto, means for rotating said converter about the central axis while cleaning fluid is delivered thereto and at a controlled rate to minimize any tendency for contaminant particles to be thrown radially by centrifugal force, and means for limiting the head of cleaning fluid in said torque converter.

6. An apparatus as defined in claim 5, wherein said means for limiting the head of cleaning fluid comprises a pressure air line connected to said supply line for delivering intermittent air pulses thereto.

7. A torque converter cleaning apparatus for cleaning a torque converter having a casing with a front pump drive coupling permitting access to the interior of the converter comprising, a stand having a fluid collector thereon with a filter screen, means for rotatably mounting the torque converter on the stand including a rotatable shaft and a mounting member connectable thereto and having means for attachment to a face of the torque converter housing, a support element extending upwardly from the stand and removably attached thereto, a standpipe movably supported by said support element and of a length to extend into the interior of the torque converter, said standpipe being of a diameter sufficiently less than the interior of the drive coupling to provide a fluid passage therebetween, spring means urging the standpipe into engagement with a part of the torque converter inside the housing thereof, and means for directing cleaning fluid through the standpipe and the torque converter while the torque converter is rotated about a central axis to carry the fluid upwardly by the elements within the torque converter, said cleaning fluid leaving the torque converter through said passage to fall to said collector with contaminants caught by said filter screen.

8. A torque converter cleaning apparatus as defined in claim 7 wherein a splash guard is supported by said support element and guides said standpipe, and a separate line connected to said standpipe for directing intermittent air pulses into the fluid to assist in cleaning the torque converter.

9. A torque converter cleaning apparatus as defined in claim 7 wherein said cleaning fluid directing means includes a pump and a filter to further insure removal of contaminants from the recirculatory system for the cleaning fluid.

10. A torque converter cleaning apparatus as defined in claim 7 wherein said fluid supply means includes a disconnectable hose having means for connection to an oil cooler in a vehicle whereby an oil cooler can also be cleaned by said apparatus to complete a transmission overhaul.

11. A cleaning apparatus as defined in claim 7 wherein said standpipe is threaded and one of several different caps can be threaded on an end thereof to provide different effective diameters for the end of the standpipe dependent upon the part of the torque converter to be engaged thereby.

References Cited

UNITED STATES PATENTS

| | | | |
|---|---|---|---|
| 1,648,501 | 11/1927 | Nystuen | 134—102 |
| 1,707,232 | 4/1929 | Naess | 134—149 |
| 2,222,516 | 11/1940 | Powell et al. | 134—22 XR |
| 2,240,364 | 4/1941 | Kimball et al. | 134—23 XR |
| 2,604,895 | 7/1952 | Fechter. | |
| 2,681,657 | 6/1954 | Griffith. | |
| 3,082,775 | 3/1963 | Timmerman et al. | 134—111 |
| 3,089,167 | 5/1963 | Jahn et al. | 134—149 XR |
| 3,103,937 | 9/1963 | Foley | 134—111 |

FOREIGN PATENTS 1,088,879   9/1960   Germany.

JOSEPH SCOVRONEK, Primary Examiner

D. G. MILLMAN, Assistant Examiner

U.S. Cl. X.R.

134—10, 33, 40, 102, 111, 149, 150, 157, 169